US009674507B2

(12) United States Patent
Pirchheim et al.

(10) Patent No.: US 9,674,507 B2
(45) Date of Patent: Jun. 6, 2017

(54) MONOCULAR VISUAL SLAM WITH GENERAL AND PANORAMA CAMERA MOVEMENTS

(71) Applicant: QUALCOMM Incorporated, San Diego, CA (US)

(72) Inventors: Christian Pirchheim, Graz (AT); Dieter Schmalstieg, Graz (AT); Gerhard Reitmayr, Vienna (AT)

(73) Assignee: QUALCOMM Incorporated, San Diego, CA (US)

( * ) Notice: Subject to any disclaimer, the term of this patent is extended or adjusted under 35 U.S.C. 154(b) by 513 days.

(21) Appl. No.: 14/151,776

(22) Filed: Jan. 9, 2014

(65) Prior Publication Data

US 2014/0320593 A1 Oct. 30, 2014

Related U.S. Application Data

(60) Provisional application No. 61/817,808, filed on Apr. 30, 2013.

(51) Int. Cl.
*H04N 7/00* (2011.01)
*H04N 13/02* (2006.01)
(Continued)

(52) U.S. Cl.
CPC ......... *H04N 13/0289* (2013.01); *G06T 7/579* (2017.01); *H04N 5/23238* (2013.01)

(58) Field of Classification Search
CPC .................................................. H04N 5/23238
(Continued)

(56) References Cited

U.S. PATENT DOCUMENTS

2011/0285810 A1 11/2011 Wagner et al.
2012/0033046 A1 2/2012 Ozaki
(Continued)

FOREIGN PATENT DOCUMENTS

WO WO 2010/114376 A1 10/2010

OTHER PUBLICATIONS

Steffen Gauglitz ("Live Tracking and Mapping from Both General and Rotation-only camera motion" IEEE International Symposium on Mixed and Augmented Reality 2012 Science and Technology Proceedings 5—Nov. 8, 2012, Atlanta, Georgia).*
(Continued)

*Primary Examiner* — Jamie Atala
*Assistant Examiner* — Masum Billah
(74) *Attorney, Agent, or Firm* — Blakely, Sokoloff, Taylor & Zafman

(57) ABSTRACT

Disclosed are a system, apparatus, and method for monocular visual simultaneous localization and mapping that handles general 6DOF and panorama camera movements. A 3D map of an environment containing features with finite or infinite depth observed in regular or panorama keyframes is received. The camera is tracked in 6DOF from finite, infinite, or mixed feature sets. Upon detection of a panorama camera movement towards unmapped scene regions, a reference panorama keyframe with infinite features is created and inserted into the 3D map. When panoramic camera movement extends toward unmapped scene regions, the reference keyframe is extended with further dependent panorama keyframes. Panorama keyframes are robustly localized in 6DOF with respect to finite 3D map features. Localized panorama keyframes contain 2D observations of infinite map features that are matched with 2D observations in other localized keyframes. 2D-2D correspondences are triangulated, resulting in new finite 3D map features.

28 Claims, 8 Drawing Sheets

(51) Int. Cl.
H04N 5/232 (2006.01)
G06T 7/579 (2017.01)
(58) Field of Classification Search
USPC .......................................................... 348/36
See application file for complete search history.

(56) References Cited

U.S. PATENT DOCUMENTS

2012/0121161 A1 5/2012 Eade et al.
2012/0300020 A1* 11/2012 Arth .......................... G06T 7/75
348/36
2015/0262029 A1 9/2015 Pirchheim et al.

OTHER PUBLICATIONS

Benhimane, et al., "Real-time image-based tracking of planes using efficient second-order minimization," Proceedings IEEE/RSJ International Conference on Intelligent Robots and Systems 2004, vol. 1, pp. 943-948 vol. 1, 2004.
Civera, et al., "Inverse depth parametrization for monocular SLAM," IEEE Transactions on Robotics, 24(5):932-945, Oct. 2008.
Civera, et al., "Interacting multiple model monocular SLAM," IEEE International Conference on Robotics and Automation, 2008, pp. 3704-3709, 2008.
Civera et al., "Drift-free real-time sequential mosaicking," Int. J. Comput. Vision, 81(2):128-137, Feb. 2009.
Davison, "Real-time simultaneous localisation and mapping with a single camera," Proceedings of the Ninth IEEE International Conference on Computer Vision (ICCV'03), pp. 1-8, IEEE Computer Society 2003.
Davison, et al., "MonoSLAM: real-time single camera SLAM," IEEE Trans. Pattern Anal. Mach. Intell., 29(6):1052-1067, 2007.
Eade, et al., "Scalable monocular SLAM," Proceedings of the 2006 IEEE Computer Society Conference on Computer Vision and Pattern Recognition, (CVPR'06) 8 pgs., IEEE Computer Society 2006.
Engels, et al., "Bundle adjustment rules," Photogrammetric Computer Vision, 2006, accessed Sep. 25, 2014 at http://citeseerx.ist.psu.edu/viewdoc/summary?doi=10.1.1.126.6901.
Hartley, et al., "4.7 Robust estimation," Multiple View Geometry in Computer Vision, Cambridge University Press, second edition, 2004, 18 pgs.
Klein, et al., "Parallel tracking and mapping for small AR workspaces," Proceedings of the 2007 6th IEEE and ACM International Symposium on Mixed and Augmented Reality, 10 pages, IEEE Computer Society, 2007.
Klein, et al., "Improving the agility of keyframe-based SLAM," Proceedings of the 10th European Conference on Computer Vision: Part II, 14 pages, 2008, accessed Sep. 25, 2014 at http://www.robots.ox.ac.uk/~gk/publications/KleinMurray2008ECCV.pdf.

Klein, et al., "Parallel tracking and mapping on a camera phone," Proceedings of the 2009 8th IEEE International Symposium on Mixed and Augmented Reality, pp. 83-86, IEEE Computer Society, 2009.
Lovegrove, et al., "Real-time spherical mosaicing using whole image alignment," Proceedings of the 11th European conference on computer vision conference on Computer vision: Part III, 14 pages, 2010, accessed Sep. 25, 2014 at https://www.doc.ic.ac.uk/~ajd/Publications/lovegrove_davison_eccv2010.pdf.
Newcombe, et al., "DTAM: Dense Tracking and Mapping in Real-Time," IEEE International Conference on Computer Vision (ICCV), pp. 2320-2327, IEEE, 2011.
Torr, P.H.S., "Bayesian model estimation and selection for epipolar geometry and generic manifold fitting," Int. J. Comput. Vision, 27 pages, Apr. 2002.
Wagner, et al., "Real-time panoramic mapping and tracking on mobile phones," Virtual Reality Conference (VR), 2010 IEEE, pp. 211-218, Mar. 2010.
Wagner, et al., "Real-time detection and tracking for augmented reality on mobile phones," IEEE Transactions on Visualization and Computer Graphics, 16(3):355-368, Jun. 2010.
Montiel, et al., "Unified Inverse Depth Parametrization for Monocular SLAM," Robotics: Science and Systems, 2006, 8 pgs, accessed Sep. 25, 2014 at www.roboticsproceedings.org/rss02/p11.pdf.
Strasdat, et al., "Real-time monocular SLAM: why filter?" 2010 IEEE International Conference on Robotics and Automation (ICRA), pp. 2657-2664, IEEE, May 2010.
PCT International Search Report and Written Opinion for International Application No. PCT/US2014/035935, mailed Aug. 20, 2014, 12 pages.
Pirchheim, et al., "Handling pure camera rotation in keyframe-based SLAM," 2013 IEEE International Symposium on Mixed and Augmented Reality (ISMAR), IEEE, Oct. 1, 2013, pp. 229-238.
Gauglitz, et al., "Live Tracking and Mapping from Both General and Rotation-Only Camera Motion" International Symposium on Mixed and Augmented Reality (ISMAR) 2012, 10 pgs.
Pirchheim, et al., "Homography-Based Planar Mapping and Tracking for Mobile Phones" Graz University of Technology Nov. 8, 2012, 10 pgs.
Wagner, et al., "Real-time Panoramic Mapping and Tracking on Mobile Phones" Graz University of Technology IEEE Virtual Reality 2010; Mar. 20-24, Waltham, Massachusetts, USA, 8 pgs.
Frese U., "Efficient 6-DOF SLAM with Treemap as a Generic Backend," IEEE International Conference on Robotics and Automation, 2007, pp. 4814-4819.
Kim H., et al., "IMAF: in situ indoor modeling and annotation framework on mobile phones," Pers Ubiquit Comput, Publisher Springer-Verlag, 2012, pp. 1-12.
Vidal-Calleja T., et al., "Active Control for Single Camera SLAM," Proceedings of the 2006 IEEE International conference on Robotics and Automation, May 2006, pp. 1930-1936.

* cited by examiner

RECEIVE A 3D MAP OF AN ENVIRONMENT, THE 3D MAP HAVING FEATURES WITH FINITE DEPTH OBSERVED IN TWO OR MORE KEYFRAMES. EACH KEYFRAME IS A PANORAMA OR REGULAR KEYFRAME. THE 3D MAP HAS FEATURES WITH INFINITE DEPTH OBSERVED IN ONE OR MORE PANORAMA KEYFRAMES.
205

TRACK THE CAMERA IN 6DOF FROM FINITE OR INFINITE FEATURES OF THE 3D MAP OBSERVED IN THE CURRENT FRAME.
210

FIG. 2

MONOCULAR VISUAL SLAM WITH GENERAL AND PANORAMA CAMERA MOVEMENTS

CROSS-REFERENCE TO RELATED ACTIONS

This application claims the benefit of U.S. Provisional Application No. 61/817,808 filed on Apr. 30, 2013, and expressly incorporated herein by reference.

FIELD

The subject matter disclosed herein relates generally to simultaneous localization and mapping.

BACKGROUND

Visual Simultaneous Localization and Mapping (SLAM) systems can process the input of a single camera and continuously build up a three dimensional (3D) model (e.g., a SLAM map) of an environment as the camera moves in Six Degrees of Freedom (6DOF). Visual SLAM systems can simultaneously track the position and orientation (pose) of the camera with respect to the 3D model. Keyframe-based visual SLAM systems can process discretely selected frames from the incoming camera image stream or feed. Keyframe-based visual SLAM systems assume general camera motion and apply structure-from-motion techniques to create 3D feature maps.

Visual SLAM systems may require sufficient parallax induced by translational or general camera motion between keyframe pairs to triangulate 3D map features. Therefore, with respect to previously selected keyframes, selection algorithms may reject candidate frames with degenerate relative rotation-only camera motion. Rotation-only camera motion for unmapped regions can cause visual SLAM systems to stall due to the lack of newly selected keyframes. Camera tracking may ultimately fail due to map unavailability. Consequently, visual SLAM systems may be forced into a relocalization mode in order to resume tracking. Therefore, improved tracking and mapping techniques are desirable.

SUMMARY

Embodiments disclosed herein may relate to a method for monocular visual simultaneous localization and mapping. In one embodiment, a machine-implemented method for image processing receives a 3D map of an environment. In one embodiment, the 3D map includes features with finite depth observed in two or more keyframes, where each keyframe is a panorama keyframe or a regular keyframe. The 3D map also includes features with infinite depth observed in one or more panorama keyframes. In one embodiment, the method tracks the camera in six degrees of freedom (6DOF) from finite or infinite depth features of the 3D map observed within an image frame from an input image feed.

Embodiments disclosed herein may relate to an apparatus for monocular visual simultaneous localization and mapping. The apparatus can include means for receiving a 3D map of an environment. In one embodiment, the 3D map includes features with finite depth observed in two or more keyframes, where each keyframe is a panorama keyframe or a regular keyframe. The 3D map also includes features with infinite depth observed in one or more panorama keyframes. In one embodiment, the apparatus can include means for tracking the camera in six degrees of freedom (6DOF) from finite or infinite depth features of the 3D map observed within an image frame from an input image feed.

Embodiments disclosed herein may relate to a device for monocular visual simultaneous localization and mapping, the device comprising hardware and software to receive a 3D map of an environment. The device can process instructions to receive a three-dimensional (3D) map of an environment. In one embodiment, the 3D map includes features with finite depth observed in two or more keyframes, where each keyframe is a panorama keyframe or a regular keyframe. The 3D map also includes features with infinite depth observed in one or more panorama keyframes. In one embodiment, the device can process instructions to track the camera in six degrees of freedom (6DOF) from finite or infinite depth features of the 3D map observed within an image frame from an input image feed.

Embodiments disclosed herein may relate to a non-transitory storage medium having stored thereon instructions that, in response to being executed by a processor in a device, execute receiving a 3D map of an environment. The medium can store instructions to receive a three-dimensional (3D) map of an environment. In one embodiment, the 3D map includes features with finite depth observed in two or more keyframes, where each keyframe is a panorama keyframe or a regular keyframe. The 3D map also includes features with infinite depth observed in one or more panorama keyframes. In one embodiment, the medium can store instructions to track the camera in six degrees of freedom (6DOF) from finite or infinite depth features of the 3D map observed within an image frame from an input image feed.

Other features and advantages will be apparent from the accompanying drawings and from the detailed description.

BRIEF DESCRIPTION OF THE DRAWINGS

FIG. 2 illustrates a flow diagram of Hybrid SLAM, in one embodiment;

DETAILED DESCRIPTION

The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

In one embodiment, the functionality of 6DOF SLAM and panoramic SLAM may be combined into a robust motion hybrid keyframe-based SLAM system that can accept both fully triangulated keyframes for normal 6DOF operation as well as keyframes with only rotational constraints. In one embodiment, Hybrid SLAM (HSLAM) can cope with pure rotation and provide a seamless tracking experience to the user. In one embodiment, HSLAM mapping utilizes 6DOF and panorama keyframes to estimate new parts of a three dimensional (3D) map (e.g., a Global SLAM Map). HSLAM can continuously track the 3D map throughout rotations away from a mapped part of a scene and can use information from camera images observed during rotation-only motion (e.g., panorama tracking) to update the 3D map. In one embodiment, HSLAM can be implemented with a single camera sensor as a type of monocular visual SLAM. As described hereinafter, HSLAM operations may be implemented by device 100 under the control of a processor to implement functionality described herein.

Figure 1:
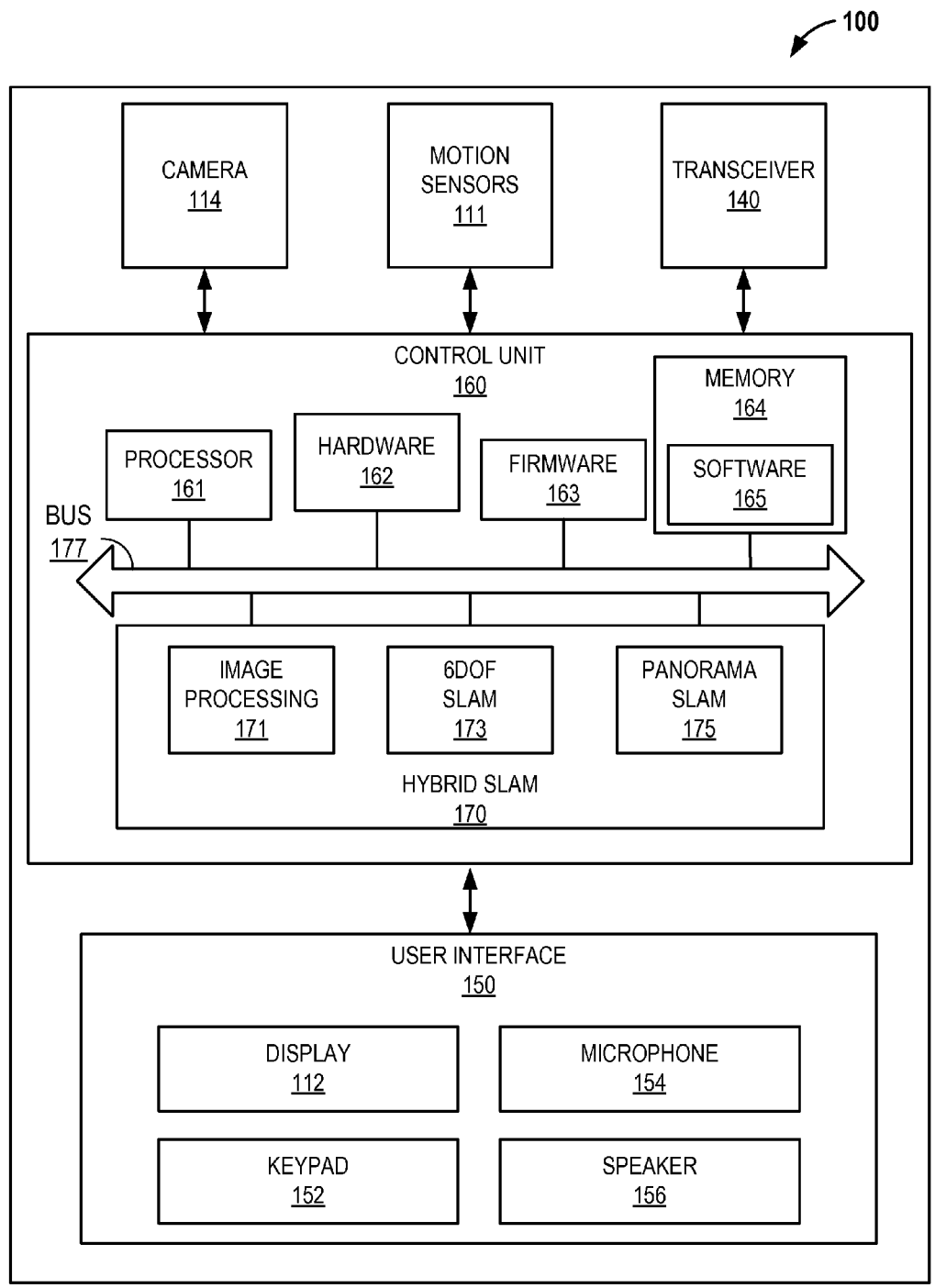
FIG. 1 is a block diagram of a system in which aspects of the invention may be practiced, in one embodiment.

FIG. 1 is a block diagram illustrating a system in which embodiments of the invention may be practiced. The system may be a device 100, which may include a general purpose processor 161, Image Processing module 171, 6DOF SLAM module 173, Panorama module 175 and a memory 164. The device 100 may also include a number of device sensors coupled to one or more buses 177 or signal lines further coupled to at least the Image Processing 171, 6DOF SLAM 173, and Panorama SLAM 175 modules. The modules 171, 173, and 175 are illustrated separately from processor 161 and/or hardware 162 for clarity, but may be combined and/or implemented in the processor 161 and/or hardware 162 based on instructions in the software 165 and the firmware 163. Control unit 160 can be configured to implement methods of performing Hybrid SLAM as described below. For example, the control unit 160 can be configured to implement functions of the mobile device 100 described in FIG. 2.

The device 100 may be a: mobile device, wireless device, cell phone, augmented reality device (AR), personal digital assistant, wearable device (e.g., eyeglasses, watch, head wear, or similar bodily attached device), mobile computer, tablet, personal computer, laptop computer, data processing device/system, or any type of device that has processing capabilities.

In one embodiment, the device 100 is a mobile/portable platform. The device 100 can include a means for capturing an image, such as camera 114 and may optionally include motion sensors 111, such as accelerometers, gyroscopes, electronic compass, or other similar motion sensing elements. The device 100 may also capture images on a front or rear-facing camera (e.g., camera 114). The device 100 may further include a user interface 150 that includes a means for displaying an augmented reality image, such as the display 112. The user interface 150 may also include a keyboard, keypad 152, or other input device through which the user can input information into the device 100. If desired, integrating a virtual keypad into the display 112 with a touch screen/sensor may obviate the keyboard or keypad 152. The user interface 150 may also include a microphone 154 and speaker 156, e.g., if the device 100 is a mobile platform such as a cellular telephone. Device 100 may include other elements unrelated to the present disclosure, such as a satellite position system receiver, power device (e.g., a battery), as well as other components typically associated with portable and non-portable electronic devices.

The device 100 may function as a mobile or wireless device and may communicate via one or more wireless communication links through a wireless network that are based on or otherwise support any suitable wireless communication technology. For example, in some aspects, the device 100 may be a client or server, and may associate with a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, Advanced LTE, 4G, CDMA, TDMA, OFDM, OFDMA, WiMAX, and Wi-Fi. Similarly, a wireless device may support or otherwise use one or more of a variety of corresponding modulation or multiplexing schemes. A mobile wireless device may wirelessly communicate with other mobile devices, cell phones, other wired and wireless computers, Internet web sites, etc.

As described above, the device 100 can be a portable electronic device (e.g., smart phone, dedicated augmented reality (AR) device, game device, or other device with AR processing and display capabilities). The device implementing the AR system described herein may be used in a variety of environments (e.g., shopping malls, streets, offices, homes or anywhere a user may use their device). Users can interface with multiple features of their device 100 in a wide variety of situations. In an AR context, a user may use their device to view a representation of the real world through the display of their device. A user may interact with their AR capable device by using their device's camera to receive real world images/video and process the images in a way that superimposes additional or alternate information onto the displayed real world images/video on the device. As a user views an AR implementation on their device, real world objects or scenes may be replaced or altered in real time on the device display. Virtual objects (e.g., text, images, video) may be inserted into the representation of a scene depicted on a device display.

In one embodiment, HSLAM can perform 6DOF SLAM, which includes tracking and mapping of a Global SLAM Map as described above. HSLAM can maintain a single SLAM Map (i.e., the Global SLAM Map) and both 6DOF SLAM and Panorama SLAM can access and update the Global SLAM Map.

In some embodiments, HSLAM, through 6DOF SLAM (e.g., as a dedicated 6DOF Module 173) can produce keyframes from captured images. HSLAM may produce the keyframe upon a determining a captured image meets a threshold translation from previous keyframes already associated with the Global SLAM Map.

In one embodiment, 6DOF SLAM (e.g., 6DOF tracking) can associate features observed from keyframes to the Global SLAM Map. 6DOF SLAM (e.g., 6DOF tracking) can use the feature associations to determine the camera position and orientation (i.e., pose) related to a respective camera image. 6DOF mapping can also update/maintain the Global SLAM Map. As discussed above, the Global SLAM Map maintained by the 6DOF SLAM may contain 3D feature points triangulated from two or more keyframes (e.g., a keyframe pair, or more than a pair of keyframes). For example, keyframes may be selected from an image or video stream or feed to represent an observed scene. For every keyframe, HSLAM can compute a respective 6DOF camera pose associated with the image. The computed pose may be referred to herein as the keyframe pose (consisting of 3DOF keyframe position and 3DOF keyframe orientation).

Panorama SLAM as used herein, refers to stitching together multiple captured images into a cohesive collection of images taken with rotation-only camera motion. HSLAM using Panorama SLAM (e.g., Panorama tracking of the Panorama module 175) may calculate three rotational degrees of freedom (3DOF) compared to the 6DOF of the 6DOF SLAM (i.e., calculated by the 6DOF Module 173). HSLAM may relate Panorama keyframes to each other using relative rotations. HSLAM may bypass or skip feature point triangulation when a minimum threshold parallax or translation is not met. For example, when the position of the camera has not changed and only pure rotation has occurred since previous keyframes, the minimum threshold parallax or translation will not be met.

HSLAM may compare a current keyframe with a previously captured keyframe to determine parallax or translation levels. Consequently, Panorama feature points may be considered rays (i.e., infinite features, infinite depth features, features without an estimated depth, or features with infinite depth). In one embodiment, 3D points generated from 6DOF SLAM are referred to as finite depth features (e.g., the features can have a specified or estimated depth).

Conventional 6DOF SLAM may not be able to process pure rotational camera movements. Tracking may be lost, and in some situations, erroneously measured finite features may corrupt the map (e.g., Global SLAM Map). In contrast, Panorama SLAM conventionally handles rotational motion while translational motion may be encoded as additional rotation, also leading to a degradation of map quality.

In one embodiment, HSLAM combines the advantages of 6DOF SLAM and Panorama SLAM into a hybrid system that can dynamically switch between 6DOF SLAM and Panorama SLAM, depending on the nature of the motion. For example, a user may make a motion that is a general motion or pure rotation. HSLAM can handle temporary rotations away from the mapped part of the scene that users often make in practice. HSLAM can also incorporate the observations of the scene made during rotational motion in a later 3D mapping step, if sufficient additional information becomes available.

In one embodiment, HSLAM can use 6DOF tracking to determine the camera pose for one or more images or video frames. HSLAM can determine camera pose by projecting features from the 3D map into an image or video frame and updating the camera pose from verified 2D-3D correspondences. HSLAM can also select new keyframes for insertion into the map. HSLAM can insert a new keyframe into the 3D map if the current camera position (i.e., translation) is sufficiently far away from every existing keyframe position. HSLAM may also insert a new keyframe into the map if the current frame's coverage with known features is below a threshold (e.g., a new or previously unmapped region of the 3D map is represented in a current frame). Additionally, HSLAM may insert a keyframe if the current camera's orientation is sufficiently far from existing keyframe orientations, and the current camera's position is translated a minimum distance from existing keyframe positions.

Alternatively, 6DOF SLAM may bypass or skip keyframe insertion if orientation has changed, but position has not sufficiently changed. When orientation changes but position does not change, 6DOF SLAM may consider the movement pure rotation. 6DOF SLAM may not triangulate or insert new finite features into the map during pure rotation.

In one embodiment, HSLAM can trigger a real-time switch from 6DOF SLAM to Panorama SLAM when threshold tracking conditions are met. For example, the threshold tracking conditions may include: sufficient orientation change (e.g., rotating the camera view), maintaining camera position (e.g., camera location is fixed or approximately the same as previous captured images), and low existing coverage (e.g., the captured image region is a new or previously unmapped region in the 3D map). For example, low existing coverage may be determined based on the HSLAM detecting that fifty percent or less of the current image is covered by known feature points, indicating that tracking may be close to becoming lost if the camera view continues to turn towards new regions. In other embodiments, HSLAM may use a generalized Geometric Robust Information Criteria (i.e., GRIC) score to trigger the switch from 6DOF SLAM to Panorama SLAM.

HSLAM can create a new keyframe containing infinite features upon switching to Panorama SLAM. HSLAM may insert the infinite feature keyframe into a database of keyframes. For example, the database of keyframes may be associated with the Global SLAM Map. In one embodiment, infinite feature keyframes may be marked or identified as a "panorama" keyframe. A panorama keyframe as used herein is a keyframe that contains infinite features or features without any calculated depth.

HSLAM may continue tracking infinite features, and insert additional panorama keyframes while the threshold tracking conditions or a threshold GRIC score is met. In one embodiment, HSLAM may assume the keyframe position of all panorama keyframes to be the same as the last 6DOF keyframe considered before switching to Panorama SLAM from 6DOF Tracking.

In one embodiment, HSLAM can use a pose refinement algorithm for processing a hybrid set of finite and infinite features together. Initialized with a pose prior, the pose refinement algorithm may compute an updated 6DOF/3DOF pose from a set of finite and infinite map features and its corresponding two-dimensional (2D) image measurements. Incremental pose updates are computed by iteratively optimizing the reprojection error both for finite and infinite map features.

In one embodiment, when a threshold number of finite features are available, a 6DOF pose will be computed. In some embodiments, a feature set purely composed from infinite features can result in a 3DOF pose instead of a 6DOF pose. In one embodiment, the HSLAM pose refinement algorithm allows for seamless switching between Panorama and 6DOF SLAM (e.g., 6DOF tracking). HSLAM can temporarily track using infinite points and switch to finite points when available (e.g., when finite feature points can be determined from a captured image of the scene). In one embodiment, if tracking is lost, HSLAM can use the Global SLAM Map to perform relocalization. If tracking is lost, HSLAM may perform full relocalization using Small Blurry Images (SBI) for all available keyframes. Alternatively, HSLAM may perform relocalization using descriptor matching. HSLAM may attempt relocalization of the Global SLAM Map using 6DOF keyframes as well as panorama keyframes.

FIG. 2 illustrates a flow diagram of Hybrid SLAM in one embodiment. At block 205, an embodiment (e.g., HSLAM) receives a 3D map of an environment. For example, HSLAM may process the Global SLAM Map. The 3D map may have features with finite depth observed in two or more keyframes. Each keyframe may be panaorma or a regular keyframe. The 3D map may have features with infinite depth observed in one or more panorama keyframes.

At block 210, the embodiment tracks the camera in 6DOF from finite or infinite features of the 3D map observed in the current frame. Camera movement may be general or pure-rotation camera movement. In one embodiment, HSLAM can estimate 6DOF poses from finite features and estimate 3DOF poses from infinite features. Tracking the panorama camera movement can continue beyond preexisting boundaries of the received 3D map (e.g., the Global SLAM Map). For example, the embodiment can use panorama SLAM to track and map new areas to add to the received 3D Map. Global SLAM Map can include one or more of: keyframes, triangulated features points, and associations between keyframes and feature points (observations).

A keyframe can consist of a captured image (e.g., an image frame captured by the device camera 114) and camera parameters used to produce the captured image. Camera parameters as used herein include camera position and orientation (pose). The Global SLAM Map can include finite and infinite features. In one embodiment, HSLAM may incorporate camera images resulting from rotation-only motion into an existing 3D map when the camera images do not meet a sufficient parallax or translation threshold.

In one embodiment, HSLAM selects a first panorama keyframe as a reference keyframe (i.e., a reference panorama keyframe), upon detection of pure-rotation camera motion. The first panorama keyframe may be localized with respect to the 3D map. For example, HSLAM may select the first received keyframe upon detecting a transition from 6DOF camera movement to panorama camera movement. HSLAM may select additional, possibly non-localized panorama keyframes (e.g., dependent keyframes). The additional panorama keyframes may be localized with respect to the 3D map later on as part of the mapping process. HSLAM may localize the additional keyframes by creating correspondences with existing map features (e.g., using active search and descriptor matching techniques). Upon localization, HSLAM can convert infinite features (i.e., infinite depth features) of the panorama keyframes by (a) matching them with features of other localized keyframes, and (b) triangulating the resulting 2D-2D correspondences (e.g., matching infinite features), resulting in additional 3D map features. In turn, further non-localized panorama keyframes may be localized with the new 3D map features.

Figure 3:
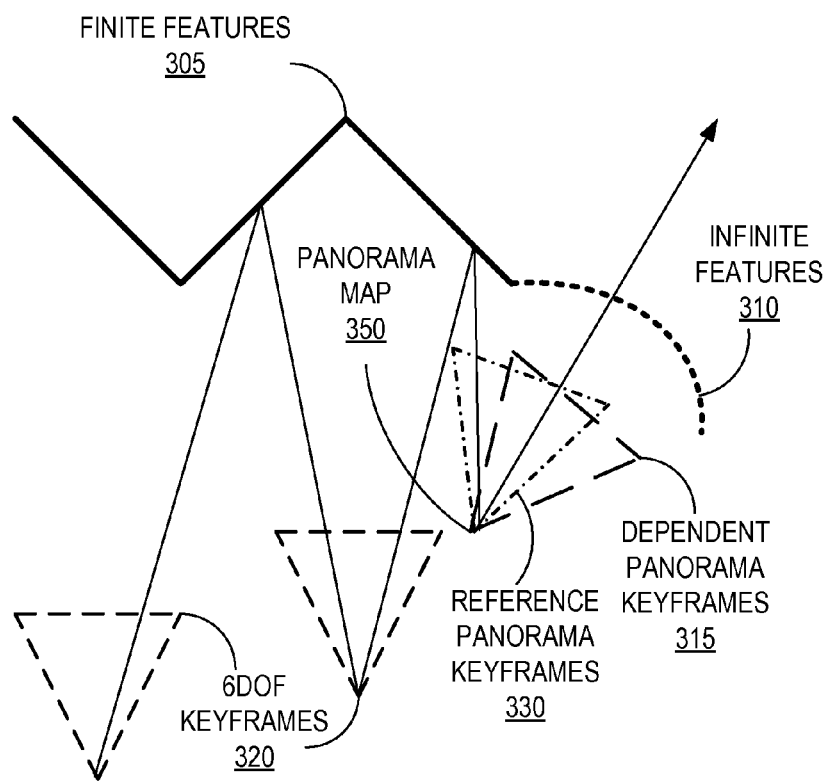
FIG. 3 illustrates a first stage of Hybrid SLAM map representation between keyframes and features, in one embodiment.

FIG. 3 illustrates a first stage of Hybrid SLAM map representation between keyframes and features, in one embodiment. The first stage illustrates 6DOF keyframes 320 which observe finite map features 305. Local panorama map 350 may be registered in the 3D map (e.g., Global SLAM Map) via reference panorama keyframes 330 that have finite 305 and infinite feature 310 observations, while the remaining dependent panorama keyframes 315 may observe infinite features 310.

Figure 4:
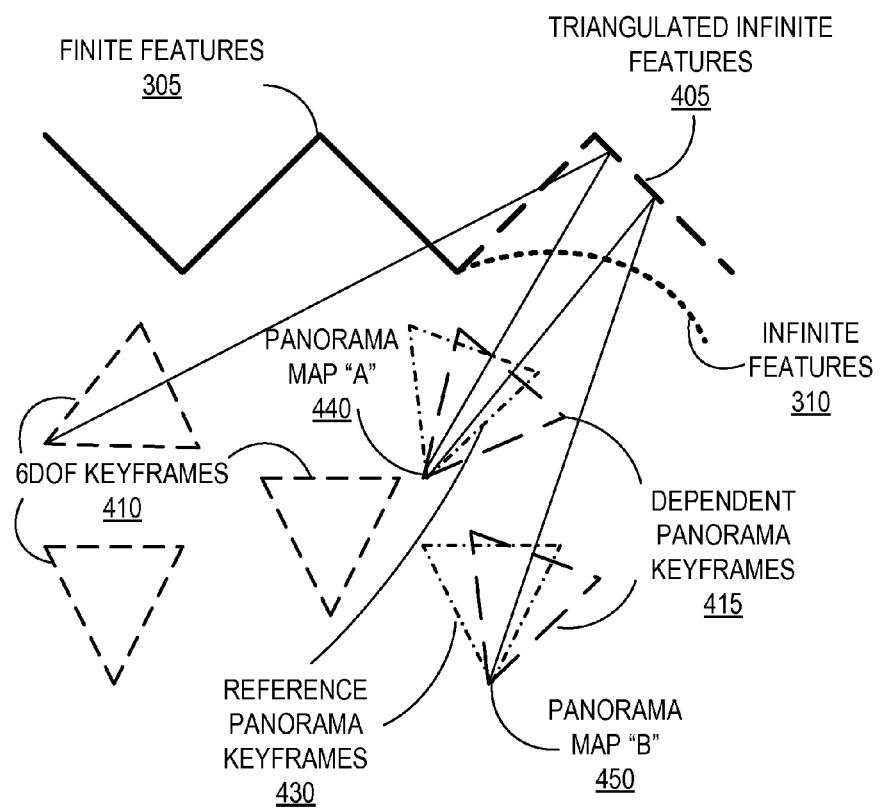
FIG. 4 illustrates a second stage of Hybrid SLAM map representation between keyframes and features, in one embodiment.

FIG. 4 illustrates a second stage of Hybrid SLAM map representation between keyframes and features, in one embodiment. In the second stage, infinite features 310 may be triangulated from corresponding observations matched between (a) additional 6DOF keyframes 410 and localized panorama keyframes (e.g., reference panorama keyframes 430) or (b) between localized panorama keyframes (e.g., reference panorama keyframes 430) from different local panorama maps (e.g., panorama map "A" 440 and panorama map "B" 450). The additional features can enable the localization of further panorama keyframes (e.g., dependent panorama keyframes 415).

Robust localization of panorama keyframes may be an iterative process to find new 2D observations of finite 3D map features in the panorama keyframes. Upon establishing sufficient 2D observations to finite 3D map features a panorama frame can be localized with a full 6DOF pose and converted to a regular (i.e., non-panorama) keyframe. Upon conversion to normal keyframes HSLAM can triangulate additional infinite feature points (e.g., 2D features), which again may allow for localizing other panorama keyframes.

Figure 5:
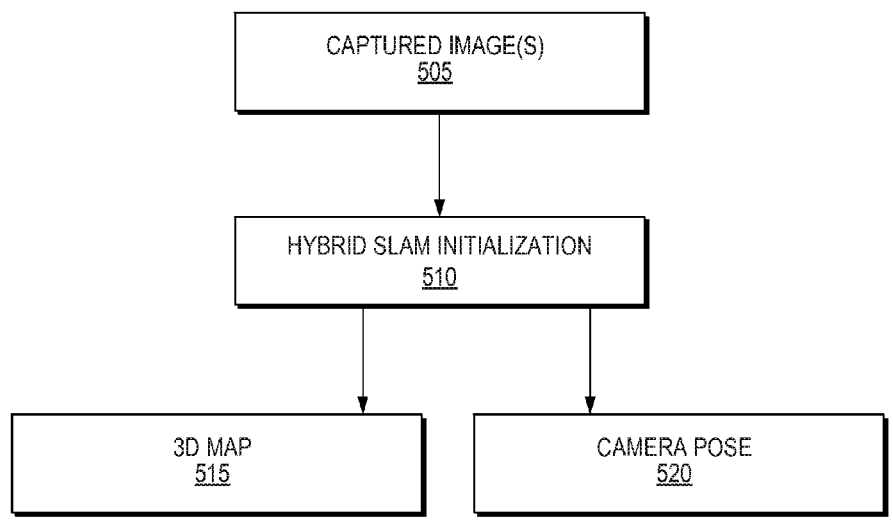
FIG. 5 illustrates a flow diagram of Hybrid SLAM initialization, in one embodiment.

FIG. 5 illustrates a flow diagram of Hybrid SLAM initialization, in one embodiment. At block 505, the embodiment (e.g., HSLAM) can receive a captured image. For example, a captured image may originate from a camera image or video feed.

At block 510, the embodiment can initialize HSLAM by creating an initial 3D Map or adding information to an existing 3D Map 515 and output camera position and orientation (pose) 520. Initializing HSLAM can include processing one or more captured images to build a 3D Map (e.g., Global SLAM Map) that has consistent scale. In some embodiments, at the beginning of launching an application on the device 100, HSLAM can launch a model-based detector and tracker to create the initial map. Upon detection of a known planar image target, HSLAM may create a first 6DOF keyframe. HSLAM can continue to track the image target and perform frame-to-frame matching of 2D-2D correspondences. The second 6DOF keyframe is selected when sufficient correspondences can be robustly triangulated. Thus, two regular 6DOF keyframes and the resulting finite map features can constitute the initial 3D map.

The 3D Map may be composed of finite and infinite point features which have 2D image observations in regular 6DOF and panorama keyframes. Each captured image may have an associated camera pose at the time the respective image was captured by the camera. In one embodiment, HSLAM can extend the capabilities of 6DOF tracking to track a Global SLAM Map during pure camera rotation. In one embodiment, HSLAM may also incorporate keyframes generated during pure camera rotation into the Global SLAM Map.

The current camera pose can be predicted by a simple constant decaying motion model. HSLAM can select a feature set to match from all Global SLAM Map features by filtering features for visibility from the predicted camera pose, infinite features of the current panorama map (e.g., panorama map), and overlapping feature re-projections where finite is preferred over infinite features. Next, the embodiment can actively search for each selected feature in the current frame using NCC as score function. Matches with a sufficiently high NCC score may be added to the correspondence set that is processed by the unified relative pose refiner. The pose refiner may output either an updated 6DOF or 3DOF pose. In case of incremental pose estimation failure, we enter relocalization which may output a 6DOF pose.

Figure 6:
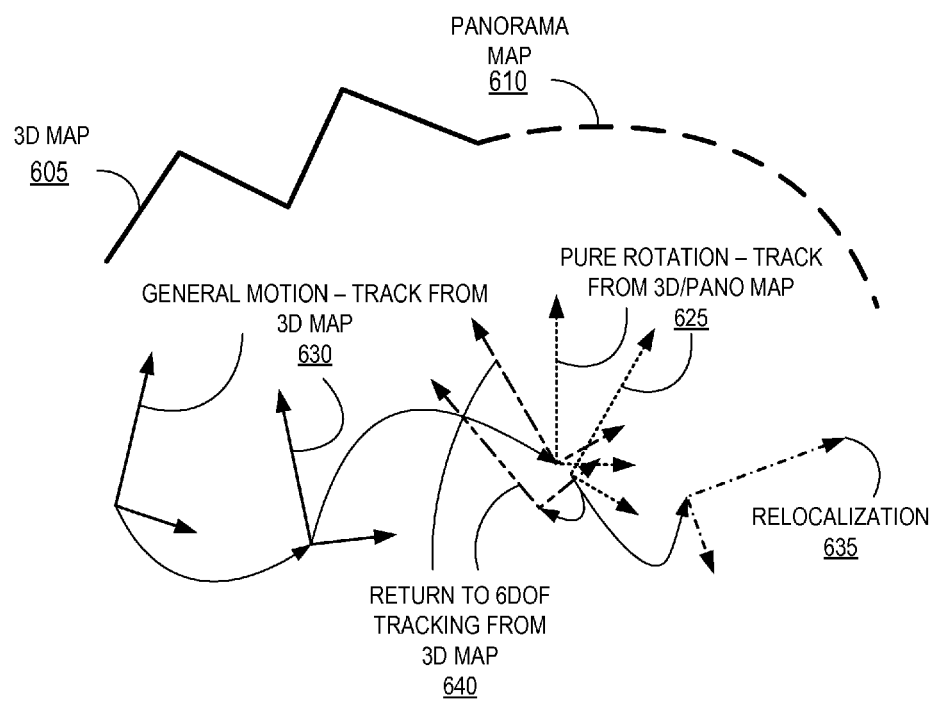
FIG. 6 illustrates 6DOF and Panorama mapping and tracking phases with alternating general and pure-rotation camera motion, in one embodiment.

FIG. 6 illustrates 6DOF and Panorama mapping and tracking phases with alternating general and pure-rotation camera motion, in one embodiment. The camera motion (e.g., general camera motion) can be tracked in 6DOF from the 3D map 605 (e.g., Global SLAM Map). Dropped keyframes can be used to refine and extend the 3D map. Switching to rotation-only camera motion 625, dropped keyframes are used to build up a local panorama map 610. Camera tracking may be performed with panorama and 3D map features. Tracking can break down due to general camera motion, leading to 6DOF camera pose relocalization 635. General camera motion can lead back onto the 3D map and tracking finite and infinite features allows for a smooth transition 640.

Figure 7:
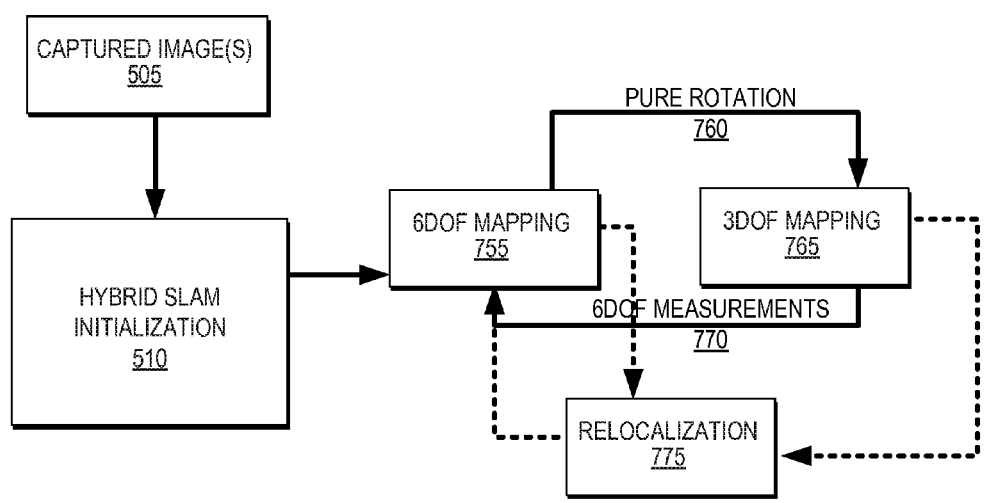
FIG. 7 illustrates a state diagram for the different states of keyframe selection during mapping, in one embodiment.

FIG. 7 illustrates a state diagram for the different states of keyframe selection during mapping. After HSLAM initialization 510, the system starts to operate in full 6DOF mapping mode 755. If pure rotation motion is detected 760, a new panorama map is created (e.g., 3DOF mapping 765). Pure rotation motion may be detected by HSLAM based on the history of tracked 6DOF poses. Tracked 6DOF poses may be stored chronologically in memory. HSLAM can compute the parallax angle between the current pose and the stored poses and discard all poses with high parallax (e.g., greater than 5 degrees). 6DOF measurements 770 can move the system back to the full 6DOF mapping mode 755. If there is a tracking failure, relocalization 775 can recover a full 6DOF pose.

Figure 8:
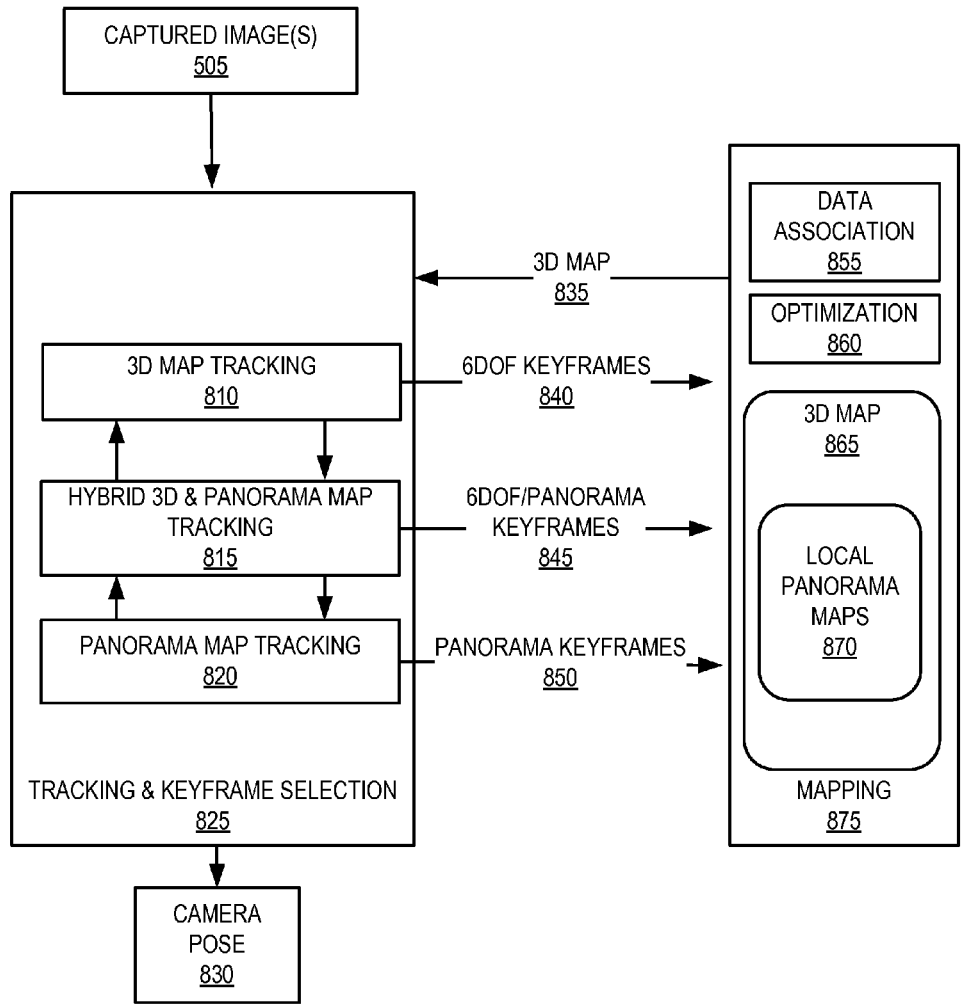
FIG. 8 is a block diagram of a Hybrid SLAM system including tracking and mapping components, in one embodiment.

FIG. 8 is a block diagram of a Hybrid SLAM system including tracking and mapping components, in one embodiment. Components can be threads, engines, or modules implemented as hardware or software. In one embodiment, HSLAM can estimate 6DOF poses from sufficient finite and infinite features that allow for tracking general and pure-rotation camera motion. Upon determining pure-rotation camera motion towards unmapped scene regions, HSLAM can continue hybrid 3D and panorama map tracking 815 and assign hybrid keyframes 845 to the 3D map 865. Upon determining pure-rotation camera motion towards unmapped scene regions, HSLAM can switch to pure panorama tracking 820 and assign panorama keyframes 850 to the Local Panorama Maps 870. Upon determining general camera motion towards mapped scene regions, HSLAM can transition back onto the Global SLAM Map (e.g., the 3D Map 865). Upon determining general camera motion towards unmapped scene regions, either tracking may fail and relocalization is invoked, or a regular 6DOF keyframe can be selected based on sufficient parallax and low coverage. In both cases HSLAM can transition back onto the 3D map with tracking 810 and assigning 6DOF keyframes 840 to the 3D map 865.

In one embodiment, a HSLAM pose tracking and keyframe selection component 825 can process the captured images (e.g., a video stream or feed) of a single calibrated camera to track general and rotation-only camera motion with respect to a 3D Map 865 (e.g., Global SLAM Map).

The tracking component can dynamically and seamlessly switch between full 6D and panoramic tracking modes, depending on current motion performed by the user. The tracking component can handle temporary rotations away from the mapped part of the scene that users often make in practice. The tracking component can detect these rotations and select special "panorama" keyframes that are used to build up local panorama maps. The local panorama maps are registered in a single consistent 3D map. General and rotation-only camera motion can be tracked with respect to a Global SLAM Map that can include finite and infinite features. In one embodiment, HSLAM enables robust frame-rate camera pose tracking and relocalization. Pose estimation can combine measurements of both finite (known 3D location) and infinite features, and HSLAM can automatically compute either a 6DOF or 3DOF pose update 830. In one embodiment, if incremental pose tracking should fail, HSLAM can relocalize based on small blurry images.

HSLAM may extract features from a keyframe image. A feature (e.g., feature point or interest point) as used herein is as an interesting or notable part of an image. The features extracted from the captured image may represent distinct points along three-dimensional space (e.g., coordinates on axes X, Y, and Z) and every feature point may have an associated feature location. The features in keyframes either match or fail to match (i.e., are the same or correspond to) the features of previously captured keyframes. Feature detection may be an image processing operation to examine every pixel to determine whether a feature exists at a particular pixel. Feature detection may process an entire captured image or, alternatively certain portions or parts of the captured image.

For each captured image or video frame, once features have been detected, a local image patch around the feature can be extracted. Features may be extracted using a well-known technique, such as Scale Invariant Feature Transform (SIFT), which localizes features and generates their descriptions. If desired, other techniques, such as Speed Up Robust Features (SURF), Gradient Location-Orientation histogram (GLOH), Normalized Cross Correlation (NCC) or other comparable techniques may be used. When the number of extracted features for an image is determined to exceed a threshold (e.g., 100 point features or other number of points) the image and features can be saved as a keyframe.

The mapping component 875 can improve map quality by data association 855 refinement and bundle adjustment optimization 860. HSLAM can perform keyframe selection to choose 6DOF and panorama keyframes 840-850 for inclusion in the 3D Map 865. The mapping component 875 can send 3D Map data 835 to the tracking component 825 in order to assist in relocalization. Additionally, HSLAM can localize panorama keyframes and triangulate infinite features to extend the 3D map.

In one embodiment, HSLAM may execute a separate mapping component (e.g., a thread, engine or module, such as mapping component 875 described above) to improve the quality of the Global SLAM Map (i.e., 3D map). For example, the mapping component 875 may perform one or more type of optimization 860 (e.g., 3D bundle adjustment). HSLAM may also estimate full 6DOF poses for panorama keyframes and triangulate infinite features to extend the 3D map.

As part of data association refinement 855, HSLAM searches for new keyframe-feature observations to further constrain existing feature locations and keyframe poses. HSLAM can apply active search and descriptor matching techniques to establish 2D-2D correspondences. HSLAM can also detect and discard outlier observations and features.

HSLAM can robustly localize panorama keyframes with respect to finite map features. Panorama keyframes can be initialized with poses from panorama tracking that are considered unreliable since poses may not be accurately estimated in full 6DOF from infinite features. However, by establishing correspondences to existing finite map features, HSLAM can estimate full 6DOF poses. Thus, HSLAM effectively converts panorama keyframes into regular 6DOF keyframes.

HSLAM can leverage information stored in local panorama maps for 3D mapping by triangulating infinite feature observations. HSLAM can employ descriptor matching to find 2D-2D correspondences between robustly localized keyframes, e.g. in separate local panorama maps that view the same scene regions. Correspondences which pass the verification tests constitute additional finite map features. Thus, HSLAM can effectively convert infinite to finite features.

HSLAM can perform optimization 860 of the map with bundle adjustment. Bundle adjustment updates the 6DOF poses of localized keyframes, and the 3D positions of finite map features by minimizing a cost function based on keyframe-feature observations. Non-localized panorama keyframes and infinite features may not part of the optimization. However, HSLAM can maintain map consistency by adjusting the registration of panorama maps within the optimized 3D map.

In one embodiment, upon determining a camera pose may be fully constrained in 6DOF, HSLAM can mark or tag the respective keyframe as a 6DOF keyframe. For example, when enough finite feature points are part of the pose estimation as described below with regards to pose tracking. Furthermore, HSLAM can select regular 6DOF keyframes when the keyframes generate enough parallax to existing keyframes while imaging a new part of the scene. Parallax can be used to ensure robust feature triangulation.

Parallax is the scale-independent triangulation angle of a 3D point location (e.g., finite 3D map features) observed from two camera views (e.g. the current camera view, keyframe camera views). HSLAM may approximate the parallax angle of the current camera view as function of the average scene depth (e.g., the mean depth of finite map features observed in the current frame) and distances between the current camera and exiting keyframe camera locations. Coverage is the ratio of the image frame area that is covered with finite map features projected into a camera view (e.g., the current camera view, keyframe camera views). HSLAM can divide image frames into a regular grid with cells and project finite map features with the camera pose. Grid cells with a minimum number of contained features are considered covered. The coverage is the ratio the number of covered grid cells vs. all grid cells.

HSLAM may select regular 6DOF keyframes based on sufficient parallax and low coverage. Parallax is required for robust feature triangulation. Coverage indicates whether the current frame pose is robustly constrained with projected map features. Low coverage indicates the camera is observing unmapped scene regions.

When HSLAM detects low coverage but not enough parallax between the current frame and existing keyframes, then tracking may fail, if no more 3D map features can be observed in the current frame. If the camera motion is close to a pure rotation, then HSLAM can trigger the selection of a localized panorama keyframe. Low coverage can indicate that the camera points towards unmapped scene regions. However, HSLAM may not create a regular 6DOF keyframe due to low parallax of pure-rotation camera motion. Thus, HSLAM can create a panorama keyframe localized with respect to the 3D map.

HSLAM can detect pure rotation camera motion based on the history of tracked 6DOF poses. Tracked 6DOF poses are stored chronologically in a history. HSLAM can compute the parallax angle between the current pose and the history and discard all poses with a sufficiently high parallax. Remaining history poses may have similar 3D locations as the current frame. Finally, if HSLAM finds a pose in the history that has low parallax and a large angle with respect to the current frame, HSLAM can compute the angles between viewing directions and detect pure rotation.

HSLAM can continue to select panorama keyframes based on low coverage and sufficient rotation. Low coverage can indicate the camera continues to explore unmapped scene regions. HSLAM can compute rotation as the difference angle between the viewing directions of the current frame and keyframe poses of the current panorama map. HSLAM can implicitly move back to the more general operation, upon observing part of the 3D map again. In general operation, HSLAM can apply the same criteria and create a new 6DOF keyframe.

As described above, device 100 can be a portable electronic device (e.g., smart phone, dedicated augmented reality (AR) device, game device, wearable device such as eyeglasses, or other device with AR processing and display capabilities). The device implementing the AR system described herein may be used in a variety of environments, such as shopping malls, streets, rooms, or anywhere a user may take a portable device. In an AR context, a user may use the device 100 to view a representation of the real world through the display of their device. A user may interact with their AR capable device by using their device's camera to receive real world images/video and superimpose or overlay additional or alternate information onto the displayed real world images/video on the device. As a user views an AR implementation on their device, real world objects or scenes may be replaced or altered in real time on the device display. Virtual objects (e.g., text, images, video) may be inserted into the representation of a scene depicted on a device display.

Movement of the device 100 and camera 114 can cause the display to update, in real-time, an augmentation of a target (e.g., one or more objects or scenes) in the Global SLAM Map. With movement of the device away from an initial reference image position, the device can capture additional images from alternate views. After extracting features and triangulating from additional keyframes, increased accuracy of the augmentation can be achieved (e.g., borders around an object may fit more precisely, the representation of the object in the scene will appear more realistic, and target placement can be more accurate relative to the camera 114 pose).

In one embodiment, an object or graphic may be inserted or integrated into a video stream (or image) captured by the camera 114 and displayed on display 112. HSLAM may optionally prompt the user for additional information to augment the target. For example, the user may be able to add user content to augment the representation of the target. User content may be an image, 3D object, video, text, or other content type that can be integrated with, or overlaid with, or replace a representation of the target.

The display may update in real-time with seamless tracking from the original scene. For example, text on a sign may be replaced with alternate text, or a 3D object may be strategically placed in the scene and displayed on device 100. When the user changes the position and orientation of the camera 114, the graphic or object can be adjusted or augmented to match the relative movement of the camera 114. For example, if a virtual object is inserted into an augmented reality display, camera movement away from the virtual object can reduce the size of the virtual object relative to the distance traveled by the camera 114. For example, taking four steps back from a virtual object should cause a greater reduction in size of the virtual object compared to taking a half step back from the virtual object, all other variables being equal. Motion graphics or animation can be animated within the scene represented by HSLAM. For example, an animated object can "move" within a scene depicted in the augmented reality display.

A person of skill in the art will recognize that embodiments described herein can be implemented in ways other than AR (e.g., robot positioning).

HSLAM may be implemented as software, firmware, hardware, module or engine. In one embodiment, the previous HSLAM description may be implemented by the general purpose processor 161 in device 100 to achieve the previously desired functions. In one embodiment, HSLAM may be implemented as an engine or module which may include an Image Processing module 171, 6DOF module 173, and Panorama module 175 as subcomponents. In other embodiments, features of one or more of the described subcomponents may be combined or partitioned into different individual components, modules or engines.

The teachings herein may be incorporated into (e.g., implemented within or performed by) a variety of apparatuses (e.g., devices). In one embodiment, the ITC can be implemented as an engine or module executed by a processor to receive images or video as input. One or more aspects taught herein may be incorporated into a phone (e.g., a cellular phone), a personal data assistant ("PDA"), a tablet, a mobile computer, a laptop computer, a tablet, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a server, a point-of-sale device, an entertainment device, a set-top box, or any other suitable device. These devices may have different power and data requirements and may result in different power profiles generated for each feature or set of features.

In some aspects a wireless device may comprise an access device (e.g., a Wi-Fi access point) for a communication system. Such an access device may provide, for example, connectivity to another network through transceiver 140 (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions or modules described may be implemented in hardware (e.g., hardware 162), software (e.g., software 165), firmware (e.g., firmware 163), or any combination thereof. If implemented in software as a computer program product, the functions or modules may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer, or data processing device/system. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A machine-implemented method for monocular visual simultaneous localization and mapping, the method comprising:

receiving a three-dimensional (3D) map of an environment, wherein the 3D map is a global simultaneous localization and mapping (SLAM) map of the environment and comprises:

features with finite depth observed in two or more keyframes, wherein each keyframe is a panorama keyframe or a regular keyframe, and features with infinite depth observed in one or more panorama keyframes;

selecting a reference panorama keyframe upon a camera transition from a six degrees of freedom (6DOF) movement to a panorama camera movement towards unmapped scene regions;

incorporating the reference panorama keyframe into the 3D map by adding finite depth and infinite depth feature observations from the reference panorama keyframe to the 3D map; and tracking the camera in 6DOF from finite or infinite depth features of the 3D map observed within an image frame from an input image feed to track the camera using the global SLAM map of the environment.

2. The machine-implemented method of claim 1, further comprising:

initializing a local panorama map registered within the 3D map, wherein initializing the local panorama map registered within the 3D map comprises:

assigning the reference panorama keyframe to the local panorama map, and registering the local panorama map within the 3D map with the 6DOF pose of the reference panorama keyframe.

3. The machine-implemented method of claim 1, further comprising:

selecting one or more dependent panorama keyframes upon a continuous panorama camera movement towards unmapped scene regions, wherein the one or more dependent panorama keyframes are dependent upon a reference panorama keyframe;

incorporating the one or more dependent panorama keyframes into the 3D map by adding infinite depth feature observations to the 3D map; and extending a local panorama map by adding the one or more dependent panorama keyframes to the local panorama map.

4. The machine-implemented method of claim 1, further comprising localizing the one or more panorama keyframes with respect to the 3D map, wherein the localizing comprises:

finding two-dimensional (2D) observations of the finite depth features within the one or more panorama keyframes;

determining 3D-2D correspondences between the 3D map and the 2D observations of the finite depth features; and estimating the 6DOF camera position and orientation of the one or more panorama keyframes using the 3D-2D correspondences.

5. The machine-implemented method of claim 1, further comprising converting infinite depth features from a first localized panorama keyframe into new finite depth features for the 3D map, wherein the converting comprises:

finding 2D observations of the infinite depth features within a second localized keyframe, wherein the second localized keyframe is a localized panorama keyframe or a localized regular keyframe;

determining 2D-2D correspondences from the 2D observations of the second localized keyframe; and triangulating the new finite depth features, wherein the triangulating the new finite depth features is based on the 2D-2D correspondences and a 6DOF camera position and orientation of a keyframe pair.

6. The machine-implemented method of claim 1, wherein the tracking further comprises:

establishing correspondences between the finite depth and the infinite depth features of the 3D map, and an image frame from an input image feed; and estimating a 6DOF camera position and orientation based on the established correspondences.

7. The machine-implemented method of claim 1, wherein the tracking further comprises:

switching from 6DOF camera movement tracking to panorama camera movement tracking upon observing only infinite depth features within an image frame from an input image feed; and switching from panorama camera movement tracking to 6DOF camera movement tracking upon observing finite depth features within the image frame from the input image feed.

8. A machine readable non-transitory storage medium containing executable program instructions which cause a data processing device to perform a method for monocular visual simultaneous localization and mapping, the method comprising:

receiving a three-dimensional (3D) map of an environment, wherein the 3D map is a global map of the environment and comprises:

features with finite depth observed in two or more keyframes, wherein each keyframe is a panorama keyframe or a regular keyframe, and features with infinite depth observed in one or more panorama keyframes;

selecting a reference panorama keyframe upon a camera transition from a six degrees of freedom (6DOF) movement to a panorama camera movement towards unmapped scene regions, wherein the panorama camera movement is a rotational camera movement in three degrees of freedom (3DOF), and wherein the 6DOF movement comprises movement in addition to, or other than, rotational movement;

incorporating the reference panorama keyframe into the 3D map by adding finite depth and infinite depth feature observations from the reference panorama keyframe to the 3D map; and tracking the camera in 6DOF from finite or infinite depth features of the 3D map observed within an image frame from an input image feed to track the camera using the global SLAM map of the environment.

9. The medium of claim 8, further comprising:

initializing a local panorama map registered within the 3D map, wherein initializing the local panorama map registered within the 3D map comprises:

assigning the reference panorama keyframe to the local panorama map, and registering the local panorama map within the 3D map with the 6DOF pose of the reference panorama keyframe.

10. The medium of claim 8, further comprising:

selecting one or more dependent panorama keyframes upon a continuous panorama camera movement towards unmapped scene regions, wherein the one or more dependent panorama keyframes are dependent upon a reference panorama keyframe;

incorporating the one or more dependent panorama keyframes into the 3D map by adding infinite depth feature observations to the 3D map; and extending a local panorama map by adding the one or more dependent panorama keyframes to the local panorama map.

11. The medium of claim 8, further comprising localizing the one or more panorama keyframes with respect to the 3D map, wherein the localizing comprises:
- finding two-dimensional (2D) observations of the finite depth features within the one or more panorama keyframes;
- determining 3D-2D correspondences between the 3D map and the 2D observations of the finite depth features; and
- estimating the 6DOF camera position and orientation of the one or more panorama keyframes using the 3D-2D correspondences.

12. The medium of claim 8, further comprising converting infinite depth features from a first localized panorama keyframe into new finite depth features for the 3D map, wherein the converting comprises:
- finding 2D observations of the infinite depth features within a second localized keyframe, wherein the second localized keyframe is a localized panorama keyframe or a localized regular keyframe;
- determining 2D-2D correspondences from the 2D observations of the second localized keyframe; and
- triangulating the new finite depth features, wherein the triangulating the new finite depth features is based on the 2D-2D correspondences and a 6DOF camera position and orientation of a keyframe pair.

13. The medium of claim 8, wherein the tracking further comprises:
- establishing correspondences between the finite depth and the infinite depth features of the 3D map, and an image frame from an input image feed; and
- estimating a 6DOF camera position and orientation based on the established correspondences.

14. The medium of claim 8, wherein the tracking further comprises:
- switching from 6DOF camera movement tracking to panorama camera movement tracking upon observing only infinite depth features within an image frame from an input image feed; and
- switching from panorama camera movement tracking to 6DOF camera movement tracking upon observing finite depth features within the image frame from the input image feed.

15. A data processing device for monocular visual simultaneous localization and mapping comprising:
- a processor; and
- a storage device coupled to the processor and configurable for storing instructions, which, when executed by the processor cause the processor to:
- receive a three-dimensional (3D) map of an environment, wherein the 3D map is a global map of the environment and comprises:
  - features with finite depth observed in two or more keyframes, wherein each keyframe is a panorama keyframe or a regular keyframe, and
  - features with infinite depth observed in one or more panorama keyframes;
- select a reference panorama keyframe upon a camera transition from a six degrees of freedom (6DOF) movement to a panorama camera movement towards unmapped scene regions, wherein the panorama camera movement is a rotational camera movement in three degrees of freedom (3DOF), and wherein the 6DOF movement comprises movement in addition to, or other than, rotational movement;
- incorporate the reference panorama keyframe into the 3D map by adding finite depth and infinite depth feature observations from the reference panorama keyframe to the 3D map; and
- track the camera in 6DOF from finite or infinite depth features of the 3D map observed within an image frame from an input image feed to track the camera using the global SLAM map of the environment.

16. The device of claim 15, further comprising instructions to cause the processor to:
- initialize a local panorama map registered within the 3D map, wherein initializing the local panorama map registered within the 3D map comprises instructions to:
- assign the reference panorama keyframe to the local panorama map, and
- register the local panorama map within the 3D map with the 6DOF pose of the reference panorama keyframe.

17. The device of claim 15, further comprising instructions to cause the processor to:
- select one or more dependent panorama keyframes upon a continuous panorama camera movement towards unmapped scene regions, wherein the one or more dependent panorama keyframes are dependent upon a reference panorama keyframe;
- incorporate the one or more dependent panorama keyframes into the 3D map by adding infinite depth feature observations to the 3D map; and
- extend a local panorama map by adding the one or more dependent panorama keyframes to the local panorama map.

18. The device of claim 15, further comprising instructions to cause the processor to localize the one or more panorama keyframes with respect to the 3D map, wherein the localizing comprises instructions to:
- find two-dimensional (2D) observations of the finite depth features within the one or more panorama keyframes;
- determine 3D-2D correspondences between the 3D map and the 2D observations of the finite depth features; and
- estimate the 6DOF camera position and orientation of the one or more panorama keyframes using the 3D-2D correspondences.

19. The device of claim 15, further comprising instructions to cause the processor to convert infinite depth features from a first localized panorama keyframe into new finite depth features for the 3D map, wherein the converting comprises instructions to:
- find 2D observations of the infinite depth features within a second localized keyframe, wherein the second localized keyframe is a localized panorama keyframe or a localized regular keyframe;
- determine 2D-2D correspondences from the 2D observations of the second localized keyframe; and
- triangulate the new finite depth features, wherein the triangulating the new finite depth features is based on the 2D-2D correspondences and a 6DOF camera position and orientation of a keyframe pair.

20. The device of claim 15, wherein the tracking further comprises instructions to cause the processor to:
- establish correspondences between the finite depth and the infinite depth features of the 3D map, and an image frame from an input image feed; and
- estimate a 6DOF camera position and orientation based on the established correspondences.

21. The device of claim 15, wherein the tracking further comprises instructions to cause the processor to:

switch from 6DOF camera movement tracking to panorama camera movement tracking upon observing only infinite depth features within an image frame from an input image feed; and switch from panorama camera movement tracking to 6DOF camera movement tracking upon observing finite depth features within the image frame from the input image feed.

22. An apparatus for monocular visual simultaneous localization and mapping comprising:
   means for receiving a three-dimensional (3D) map of an environment, wherein the 3D map is a global map of the environment and comprises:
      features with finite depth observed in two or more keyframes, wherein each keyframe is a panorama keyframe or a regular keyframe, and
      features with infinite depth observed in one or more panorama keyframes;
   means for selecting a reference panorama keyframe upon a camera transition from a six degrees of freedom (6DOF) movement to a panorama camera movement towards unmapped scene regions, wherein the panorama camera movement is a rotational camera movement in three degrees of freedom (3DOF), and wherein the 6DOF movement comprises movement in addition to, or other than, rotational movement;
   means for incorporating the reference panorama keyframe into the 3D map by adding finite depth and infinite depth feature observations from the reference panorama keyframe to the 3D map; and
   means for tracking the camera in 6DOF from finite or infinite depth features of the 3D map observed within an image frame from an input image feed to track the camera using the global SLAM map of the environment.

23. The apparatus of claim 22, further comprising:
   means for initializing a local panorama map registered within the 3D map, wherein initializing the local panorama map registered within the 3D map comprises:
   means for assigning the reference panorama keyframe to the local panorama map, and
   means for registering the local panorama map within the 3D map with the 6DOF pose of the reference panorama keyframe.

24. The apparatus of claim 22, further comprising:
   means for selecting one or more dependent panorama keyframes upon a continuous panorama camera movement towards unmapped scene regions, wherein the one or more dependent panorama keyframes are dependent upon a reference panorama keyframe;
   means for incorporating the one or more dependent panorama keyframes into the 3D map by adding infinite depth feature observations to the 3D map; and
   means for extending a local panorama map by adding the one or more dependent panorama keyframes to the local panorama map.

25. The apparatus of claim 22, further comprising means for localizing the one or more panorama keyframes with respect to the 3D map, wherein the means for localizing comprises:
   means for finding two-dimensional (2D) observations of the finite depth features within the one or more panorama keyframes;
   means for determining 3D-2D correspondences between the 3D map and the 2D observations of the finite depth features; and
   means for estimating the 6DOF camera position and orientation of the one or more panorama keyframes using the 3D-2D correspondences.

26. The apparatus of claim 22, further comprising means for converting infinite depth features from a first localized panorama keyframe into new finite depth features for the 3D map, wherein the means for converting comprises:
   means for finding 2D observations of the infinite depth features within a second localized keyframe, wherein the second localized keyframe is a localized panorama keyframe or a localized regular keyframe;
   means for determining 2D-2D correspondences from the 2D observations of the second localized keyframe; and
   means for triangulating the new finite depth features, wherein the triangulating the new finite depth features is based on the 2D-2D correspondences and a 6DOF camera position and orientation of a keyframe pair.

27. The apparatus of claim 22, wherein the tracking further comprises:
   means for establishing correspondences between the finite depth and the infinite depth features of the 3D map, and an image frame from an input image feed; and
   means for estimating a 6DOF camera position and orientation based on the established correspondences.

28. The apparatus of claim 22, wherein the tracking further comprises:
   means for switching from 6DOF camera movement tracking to panorama camera movement tracking upon observing only infinite depth features within an image frame from an input image feed; and
   means for switching from panorama camera movement tracking to 6DOF camera movement tracking upon observing finite depth features within the image frame from the input image feed.

* * * * *